United States Patent
Holliday et al.

(10) Patent No.: US 7,286,309 B2
(45) Date of Patent: *Oct. 23, 2007

(54) INFRARED SIGHT GLASS FOR AFTERMARKET FITMENT

(76) Inventors: Graham R. Holliday, 78 High Street, Marske-by-sea, Yorkshire, TS116JX (GB); Antony J. Holliday, 30 Fernwood, Redcar, Yorkshire, TS104NF (GB)

(*) Notice: Subject to any disclaimer, the term of this patent is extended or adjusted under 35 U.S.C. 154(b) by 0 days.

This patent is subject to a terminal disclaimer.

(21) Appl. No.: 11/437,390

(22) Filed: May 19, 2006

(65) Prior Publication Data

US 2006/0209397 A1   Sep. 21, 2006

Related U.S. Application Data

(63) Continuation of application No. 10/766,356, filed on Jan. 28, 2004.

(51) Int. Cl.
G02B 13/14 (2006.01)
G01F 23/02 (2006.01)

(52) U.S. Cl. .................... 359/894; 359/350; 73/334

(58) Field of Classification Search ............ 359/350, 359/355, 511–513, 611, 894, 903; 73/323, 73/334, 325

See application file for complete search history.

(56) References Cited

U.S. PATENT DOCUMENTS

| | | |
|---|---|---|
| 2,013,448 A | 9/1935 | Roby |
| 2,511,893 A | 6/1950 | Alden |
| 3,054,088 A | 9/1962 | Shwisha |
| 3,584,640 A | 6/1971 | Chapman |
| 4,436,375 A | 3/1984 | Meginnis |
| 4,714,303 A | 12/1987 | Suzuki et al. |
| 5,793,522 A | 8/1998 | Brun |
| 2003/0030748 A1 | 2/2003 | Jung |

*Primary Examiner*—Alessandro Amari
*Assistant Examiner*—Mark Consilvio
(74) *Attorney, Agent, or Firm*—John H. Pearson, Jr. Esq.; Walter F. Dawson, Esq.; Pearson & Pearson, LLP.

(57) ABSTRACT

An infrared sight glass for aftermarket fitment around an opening of an enclosure which enables thermal inspection of electrical equipment within the enclosure. The mounting of the sight glass is performed externally which avoids having to access the interior of the enclosure. The infrared sight glass comprises an infrared transmitting medium to facilitate use of an external infrared thermal imaging camera for monitoring the electrical equipment. A removable protective cover is locked into a closed position by security key screws and is easily removed by a slight twist when the key screws are loosened.

6 Claims, 4 Drawing Sheets

INFRARED SIGHT GLASS FOR AFTERMARKET FITMENT

CROSS-REFERENCE TO RELATED APPLICATIONS

This application is a continuation of prior Application Ser. No. 10/766,356, filed Jan. 28, 2004.

BACKGROUND OF THE INVENTION

1. Field of the Invention

This invention relates to thermal inspection of electrical equipment using an infrared camera, and in particular to an infrared sight glass adapted for rapid fitment to an existing enclosure without needing access to the interior of the enclosure containing the monitored equipment.

2. Description of Related Art

Thermographic inspection of electrical equipment is carried out using a specially adapted camera which registers infrared radiation and converts this to a visible image. The particular advantage is that for accurate thermographic inspections to take place, the equipment to be inspected must be under normal running conditions. A problem occurs when the electrical equipment is contained within an enclosure, and the infrared radiation which the camera detects is unable to penetrate the enclosure in an identifiable form. The provision of a glass or plastic sight glass in the equipment would not solve the problem as infrared radiation cannot penetrate either of these mediums. The solution is to use a sight glass which contains an infrared transparent medium. Infrared transparent sight glasses in the prior art suffer from the following disadvantages: 1) They require access to the interior of the enclosure to facilitate installation, and 2) The fragile infrared transparent medium is protected by means of a rotating shield or cover which when closed is not locked into place, thus such a sight glass cannot be used in public places where unauthorized persons could be exposed to an electric shock hazard.

In U.S. Pat. No. 5,793,522, issued Aug. 11, 1998 to Michel Brun, of Bizanos, France and. assigned to Comet, of Paris, France discloses an observation window for checking the temperature of objects within a screened cabinet using infrared thermographics. An observation window comprising a parallel-faced transparent insert is provided which is made of a single crystal suitable for radiation to pass through without being substantially changed, such radiation having a wavelength, which may range from the visible to the relatively far infrared, emanates from an object whose temperature is to be monitored. The insert is fitted into a support which surrounds it at its periphery with respect to the support. The support is applied in a sealed manner against an aperture in the door and then locked in position by means that are only accessible from inside the cabinet.

Therefore, it is desirable to have an infrared sight glass that may be installed on the enclosure of operating electrical equipment from the outside without the need for access to the inside of the enclosure.

SUMMARY OF THE INVENTION

Accordingly, it is therefore an object of this invention to provide an infrared sight glass which is adapted to facilitate its ready fitment over an aperture of an electrical enclosure to enable thermal monitoring of components therein.

It is another object of this invention to provide an infrared sight glass which is adapted to facilitate its rapid fitment to an existing enclosure in-situ as an aftermarket modification without the requirement to access the interior of the equipment to be monitored.

It is a further object of this invention to provide an infrared sight glass which includes a removable protective security cover which locks into a closed position by means of security screws which require a special key to remove in order to facilitate infrared inspection.

It is another object of this invention to provide an infrared sight glass which includes a quick twist security cover which is easily removed after loosening of special key security screws.

These and other objects are accomplished by an infrared sight glass for fitting over an aperture on an enclosure of electrical equipment for thermographic inspection comprising means for supporting an infrared transmitting medium, means for attaching the supporting means adjacent to the aperture on the enclosure of the electrical equipment without accessing an inside of the enclosure, and means for attaching a cover to an outer surface of the supporting means. The attaching means comprises security keying. The supporting means comprises a first gasket positioned between the infrared transmitting medium and a recessed portion of the supporting means. The first gasket comprises a double sided self-adhesive gasket. A second gasket is positioned between a ring surface of the supporting means and a corresponding surface around the aperture of the enclosure. The supporting means comprises holes for receiving screws to attach the supporting means to the enclosure from outside the enclosure. The infrared sight glass comprises a tag shield having an aperture corresponding to and adjacent to the aperture of the enclosure, the tag shield being positioned between the enclosure and the supporting means. A third gasket is attached between the tag shield and a ring surface of the supporting means, and a fourth gasket is attached between the tag shield and around the aperture of the enclosure. The cover comprises diametrically opposite keyhole slots for receiving the attaching means and enabling the cover to be rotated into a secured position on the infrared sight glass. The cover comprises diametrically opposite holes for receiving the attaching means.

The objects are further accomplished by a method of fitting an infrared sight glass over an aperture of an enclosure of electrical equipment for thermographic inspection comprising the steps of supporting an infrared transmitting medium within a frame, attaching the frame adjacent to the aperture on the enclosure without accessing an inside of the enclosure, and providing a security cover on an outer surface of the frame. The step of attaching the supporting means to the enclosure comprises the step of providing holes in the frame for receiving screws to secure the frame to the enclosure. The method comprises the step of providing a tag shield having an aperture corresponding to and adjacent to the aperture of the enclosure, the tag shield being positioned between the enclosure and the frame. The step of providing a security cover comprises the step of providing diametrically opposite key slots in the cover for inserting security keying screws. The step of providing a security cover comprises the step of providing screws having predetermined keying for securing the security cover to the frame.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
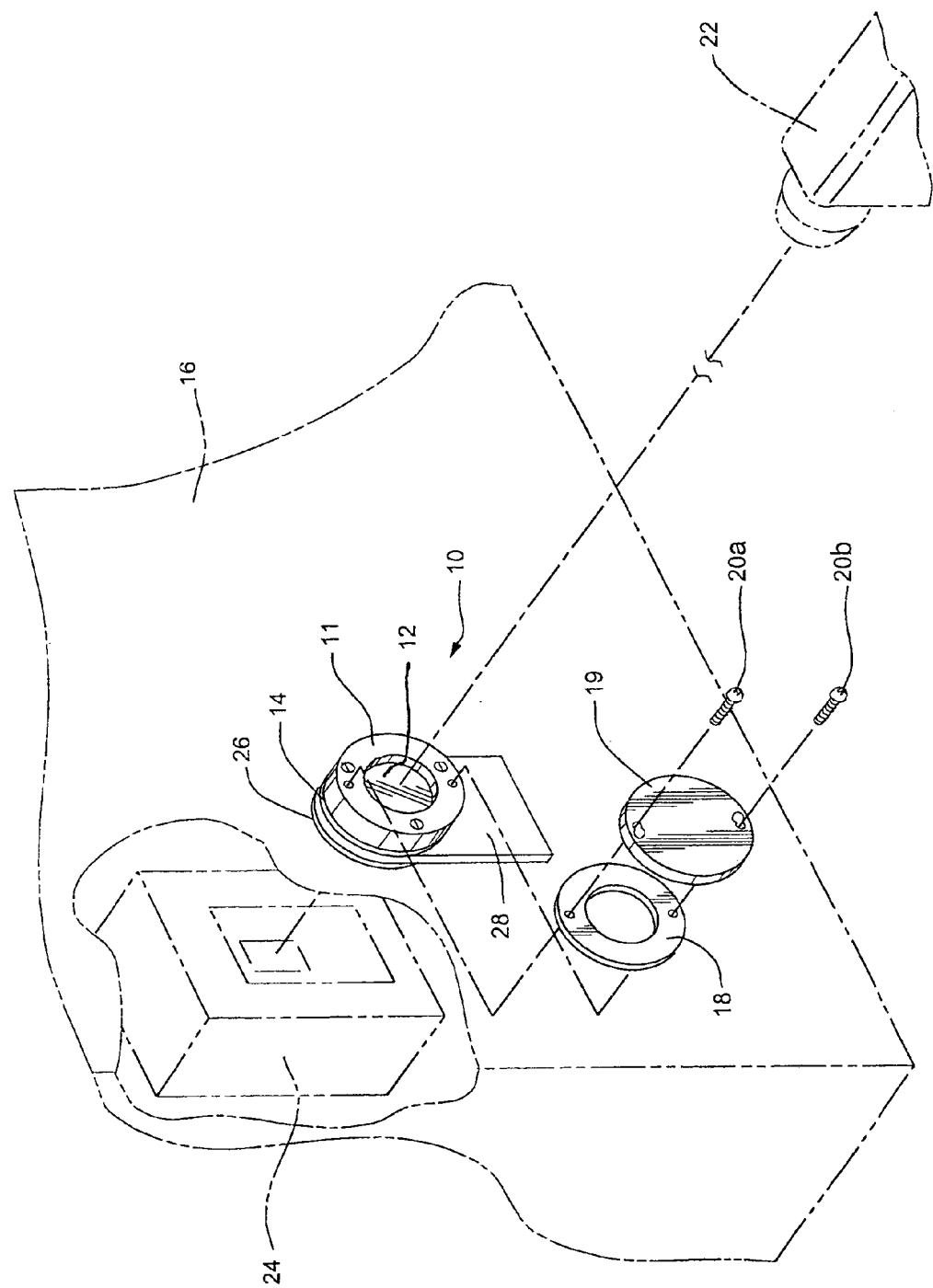
FIG. 1 is a partial perspective view which diagrammatically represents an electrical apparatus inside an enclosure having a voltage causing an apparatus temperature rise and an infrared thermal imaging camera aimed through a sighting glass at the apparatus.

Referring to FIG. 1, a partial perspective view of an enclosure 16 is shown having electrical apparatus 24 inside which receives a voltage causing a temperature rise. On the side of the enclosure 16 is mounted an infrared sight glass 10. An infrared thermal imaging camera 22 is positioned adjacent to the infrared sight glass 10 and in the line of sight of the electrical apparatus 24 for monitoring the temperature of the electrical apparatus 24. The infrared sight glass 10 is rapidly fitted on the existing enclosure 16 from the outside without needing access to the enclosure 16 of the monitored apparatus 24. In addition, a gasket 18 and a protective security cover 19 are provided on the outside of the infrared sight glass 10.

Figure 2:
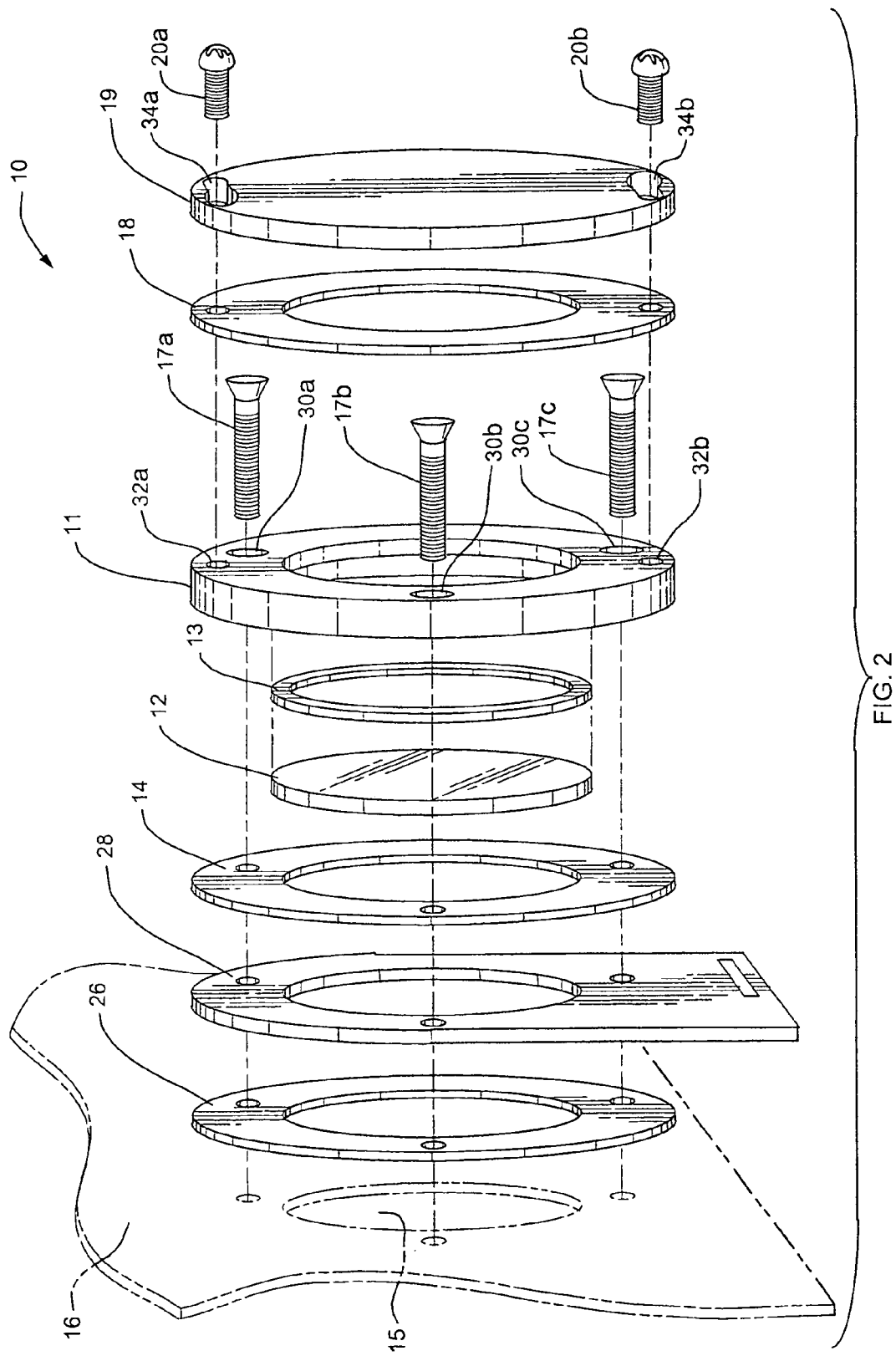
FIG. 2 is an exploded view of the infrared sight glass for aftermarket fitment including protective security cover.

Referring to FIG. 2, an exploded view of the infrared sight glass 10 is shown according to the present invention for use on the enclosure 16 with heat generating apparatus 24 and in particular for aftermarket fitment on such enclosure 16. The enclosure 16 comprises an aperture 15 around which the infrared sight glass 10 is mounted. A frame 11 is provided which is embodied by an aluminum ring having five holes 30a, 30b, 30c, 32a and 32b, three of the holes 30a, 30b and 30c being used for mounting the infrared sight glass 10 to the enclosure 16. The frame 11 comprises a recessed circular area on its inner side area for receiving a double-sided gasket 13 and a lens 12 which is an infrared transmitting medium having a diameter of approximately 75 mm and a thickness of approximately 2 mm.

The frame 11 is attached to the enclosure 16 by three counter sunk screws 17a, 17b and 17c which are inserted through the outer face of the frame 11. However, a tag shield 28 is inserted between the frame 11 and the enclosure 16. The tag shield 28 provides a place to print safety information required for UL ratings. A gasket 14 is provided between the frame 11 and the tag shield 28. Another gasket 26 is provided between the tag shield 28 and the enclosure 16. The gaskets 26, 28 and the tag shield 28 comprise aligned holes for receiving screws 17a, 17b, and 17c which are shaving free roll thread type screws and commonly available in the art. The frame 11 comprises two additional holes 32a, 32b for receiving security keying screws 20a and 20b which mount a security cover 19 to the frame 11. A gasket 18 is provided between the outer face of the frame 11 and the security cover 19.

Figure 4:
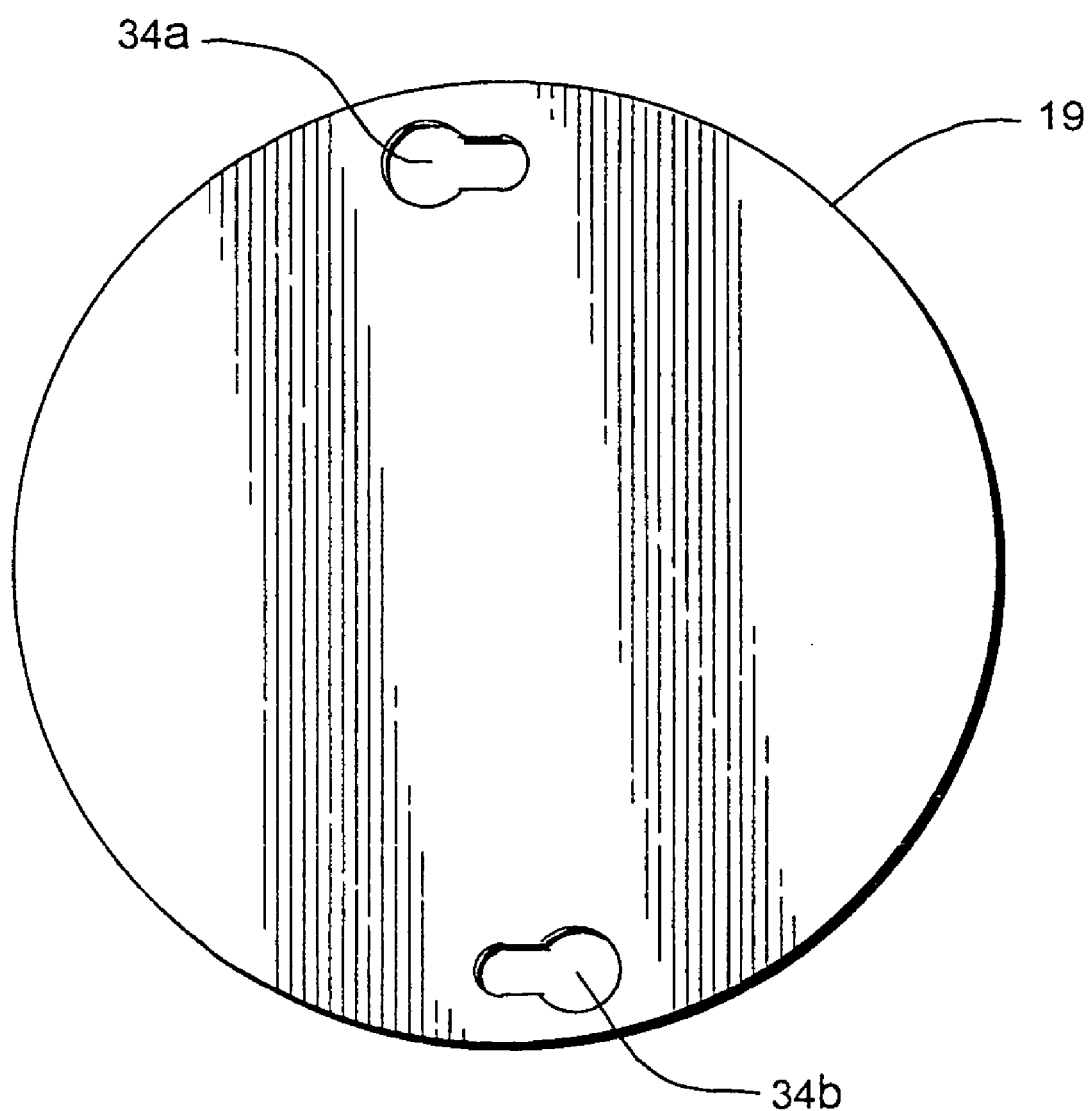
FIG. 4 is a front elevational view of a security cover having keyhole slots.

Referring to FIG. 2 and FIG. 4, FIG. 4 is a front elevational view of the security cover 19 comprising a pair of keyhole slots 34a, 34b each positioned diametrically opposite each other for receiving the security keying screws 20a and 20b. In the preferred embodiment the keyhole slots 34a, 34b are 6 mm holes with curved slots to 10 mm, offset 12 degrees at 80 mm PCD. The head of the security screws 20a and 20b comprise an internal star with a pin in the middle. The keyhole slots 34a, 34b permit the security cover 19 to be easily removed after the security screws 20a, 20b are loosened and the cover 19 rotated slightly. Similarly, the security cover is easily put back on by inserting the heads of screws 20a, 20b through the holes 34a, 34b and slightly rotating the cover 19 followed by tightening the security screws 20a, 20b. An alternate embodiment of the security cover 19 comprises diametrically opposite circular holes (without slots) for receiving security screws 20a, 20b.

Figure 3:
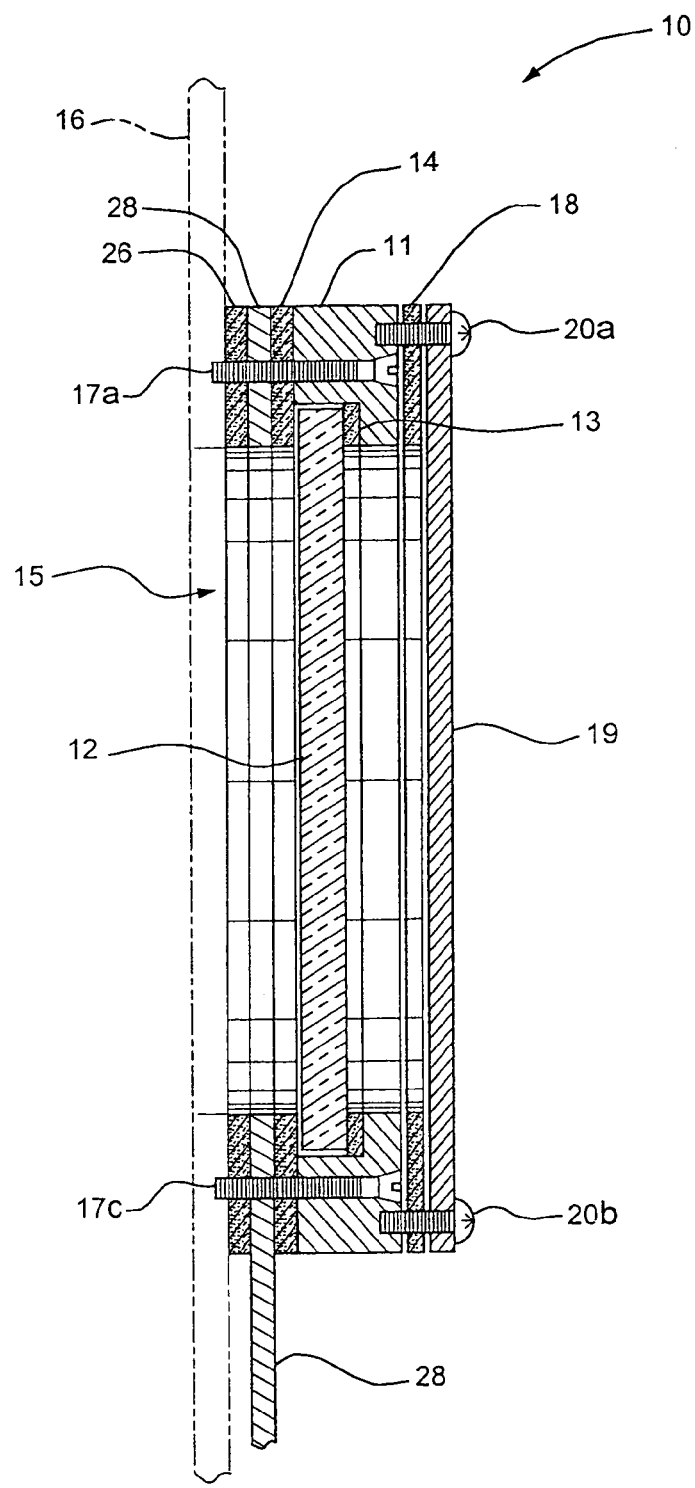
FIG. 3 is a side sectional view of the invention of an infrared sight glass for aftermarket fitment.

Referring to FIG. 2 and FIG. 3, FIG. 3 is a side sectional elevational view of the infrared sight glass 10 according to the present invention for external fitment on enclosure 16 comprising a quick twist security cover 19. The infrared sight glass 10 comprises a metallic or other suitably robust frame 11, and a lens 12 or a suitably perforated medium for the transmitting of infrared radiation in the required spectrum. The frame 11 has a first forward face provided with a recess to receive the lens 12 or a suitably perforated medium, such that the lens 12 or suitably perforated medium first face lies generally flush with the first face of the frame 11 at least at an edge portion thereof, the lens 12 or other suitably perforated medium being attached to the frame 11 at the first face of the recess by means of a silicon, double sided self-adhesive gasket 13 which has an inside diameter of 67 mm, an outside diameter of 74 mm, and a thickness of 1.5 mm. The frame 11 containing the lens 12 is then in turn fitted with a self-adhesive frame mount gasket 14 having a pair of opposing self-adhesive surfaces, so configured that a first adhesive surface engages over the first face of the frame 11 and the edge portion of the lens 12, and its second adhesive surface engages around a suitable aperture 15 within the enclosure 16 when the tag shield 28 is not used. The gasket 14 may be embodied with silicon material and has an inside diameter of 68 mm, an outside diameter of 100 mm, and a thickness of 2 mm. Gasket 14 also comprises 3 holes, 6 mm in diameter at 88 mm PCD with 120 degree offset.

When the tag shield 28 is used as shown in FIG. 3, then the second adhesive surface of gasket 14 engages around a similar aperture of the tag shield 28. Another double sided gasket 26 similar to gasket 14 is inserted between the tag shield 28 and a second adhesive side engages around the aperture 15 within the enclosure 16. A first adhesive side of gasket 26 engages around the second side of the aperture in the tag shield 28 which is equivalent to the aperture in gasket 13. The frame 11 is additionally fixed to the enclosure 16 by means of three countersunk screws 17 of the shaving free roll thread type inserted through clearance holes in the frame 11 and tightened into fixing holes 21a, 21b, 21c drilled into the enclosure 16. Therefore, the enclosure 16 must have an aperture 15, which is made available by the electrical apparatus manufacturer or it is cut-out by a hole-saw, and predrilled fixing holes 21a, 21b, 21c before the infrared sight glass 10 can be installed on the enclosure 16. By simplifying the installation of the infrared sight glass 10 in this manner, the invention facilitates the ready and rapid fitment of the infrared sight glass 10 to an enclosure 16 in-situ, minimizing the need for expensive downtime of the electrical apparatus 24 within enclosure 16.

A gasket 18, having a first face of self-adhesive and a second face being smooth, is fixed to the second face of the frame 11 by its adhesive first face such that two holes through the faces of the aforementioned gasket 18 align with the tapped holes 32*a*, 32*b* in the second face of the frame 11. The gasket 18 may be embodied with silicon material having an inside diameter of 68 mm, an outside diameter of 100 mm, and a thickness of 1.5 mm. The two holes are 6 mm in diameter at 88 mm PCD with 180 degrees offset. The metallic or other suitably robust security cover 19 is then fitted to the second face of the frame 11 by means of two screws 20*a* and 20*b*. The screws 20*a*, 20*b* pass through clearance holes 34*a* and 34*b* in the security cover 19 and locate through the aforementioned gasket 18 into the aforementioned holes tapped into the second face of the frame 11. As previously described, the aforementioned screws 20*a*, 20*b* are of a type which cannot be removed without a star key for security purposes. By locking the security cover 19 in this manner, the invention facilitates the use of the infrared sight glass 10 in public places such that the fragile lens 12 cannot be tampered with by unauthorized persons thus improving the safety features.

This invention has been disclosed in terms of a certain embodiment. It will be apparent that many modifications can be made to the disclosed apparatus without departing from the invention. Therefore, it is the intent of the appended claims to cover all such variations and modifications as come within the true spirit and scope of this invention.

What is claimed is:

1. A method of making an infrared sight glass for attaching over an aperture of an enclosure of electrical equipment from the outside for thermographic inspection comprising the steps of:

providing an infrared transmitting medium;

positioning a double sided self-adhesive gasket between said infrared transmitting medium and a recessed portion of a frame to prevent unauthorized removal of said security cover;

providing a tag shield having an aperture corresponding to and adjacent to said aperture of said enclosure, said tag shield being positioned between said enclosure and said frame;

attaching a second gasket between said tag shield and a ring surface of said frame;

attaching a third gasket between said tag shield and around the aperture of said enclosure;

attaching said frame adjacent to said aperture on said enclosure of electrical equipment without accessing an inside of said enclosure; and providing a security cover to attach on an outer surface of said frame to prevent unauthorized removal of said security cover.

2. The method as recited in claim 1 wherein said step of attaching said frame on said enclosure comprises the step of providing holes in said frame for receiving screws to secure said frame to said enclosure.

3. The method as recited in claim 1 wherein said step of providing a security cover comprises the step of providing diametrically opposite holes with curved slots in said cover for inserting security screws.

4. The method as recited in claim 1 wherein said step of providing a security cover comprises the step of providing security screws, each of said screws comprises predetermined head keying for securing said security cover to said frame.

5. The method as recited in claim 1, wherein said method comprises the step of positioning a fourth gasket between a ring surface of said frame and a cover.

6. The method as recited in claim 1 wherein said method comprises the step of providing a pair of holes in said cover, each of said holes positioned diametrically opposite each other and having curved slots offset approximately 12 degrees from the center of each of said holes, said curved slots extending from opposite sides of each of said holes.

* * * * *